United States Patent
Gretz

(10) Patent No.: US 6,600,117 B1
(45) Date of Patent: Jul. 29, 2003

(54) TWO-PIECE DOORBELL BUTTON MOUNTING DEVICE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/121,487

(22) Filed: Apr. 12, 2002

(51) Int. Cl.[7] ............... H01H 13/04; H01H 13/08; H01H 13/10; H01H 19/04; H01H 19/08
(52) U.S. Cl. .......... 200/294; 200/17 R; 200/333; 174/48; 220/3.3
(58) Field of Search .............. 200/294, 296, 200/17 R, 52 R, 293, 300, 333; 174/48, 49, 53, 50, 55, 56, 58, 66, 65 R; 220/3.3, 3.4, 3.5

(56) References Cited

U.S. PATENT DOCUMENTS

| | | | |
|---|---|---|---|
| 3,619,477 A | * 11/1971 | Rasmussen | 220/24.2 |
| 5,133,165 A | * 7/1992 | Wimberly | 52/221 |
| 5,326,060 A | * 7/1994 | Chubb et al. | 248/231.9 |
| 5,598,670 A | * 2/1997 | Humphrey et al. | 52/220.8 |
| 5,804,764 A | * 9/1998 | Gretz | 174/53 |
| 5,929,378 A | * 7/1999 | Guisti | 174/65 R |
| 5,967,354 A | * 10/1999 | Whitehead et al. | 220/3.3 |
| 6,429,371 B2 | * 8/2002 | Schiedegger et al. | 174/50 |

* cited by examiner

Primary Examiner—Elvin Enad
Assistant Examiner—K. Lee

(57) ABSTRACT

A two-piece doorbell button mounting device for securing doorbell pushbuttons to structures having vinyl siding or stucco. The device includes an enclosure and a cover member. The enclosure includes a peripheral wall, a flange extending from the base of the wall, and projections from the top of the wall. Fasteners may be installed through the flange to secure the enclosure directly to an exposed substrate. Alternately, for installation in finished structures, the flange includes a break away feature that allows it to be broken away from the enclosure. A hole is then cut in the exterior siding or stucco and the enclosure inserted through the hole and against the substrate. Fasteners may then be fed through apertures in the interior of the enclosure to secure the enclosure to the substrate. A cover member including an opening is then secured to the enclosure. Wiring is fed through the enclosure and cover member, connections are completed, and a doorbell button secured to the cover. Apertures may be formed in the cover member and thick wall portions on the projections to enable drilling of apertures to match hole spacing for attachment of a wide variety of doorbell buttons to the cover and enclosure. The two-piece doorbell button mounting device provides an attractive arrangement for securing doorbell buttons to flexible and soft exterior surfaces.

8 Claims, 6 Drawing Sheets

TWO-PIECE DOORBELL BUTTON MOUNTING DEVICE

FIELD OF THE INVENTION

The present invention relates to the installation of doorbell buttons, and more particularly to a two-piece doorbell button mounting device that provides a method and device for more secure and permanent installation of doorbell buttons to the exterior of buildings, especially those having flexible or soft exterior sidings such as vinyl siding or stucco.

BACKGROUND OF THE INVENTION

It is well known to mount doorbell buttons to doorjambs or to the exterior surface of a building proximate the door. Commercial doorbell buttons typically include two apertures and are typically secured with fasteners such as screws. If the exterior surface of the house is firm and constructed of wood, brick, or other durable material, then a doorbell button can easily be mounted on the exterior surface. However, the exterior of many houses are now constructed of stucco or flexible coverings such as vinyl siding. Stucco houses, which are very prevalent in certain areas, do not provide a secure and durable surface for mounting of devices by typical fastening means. Drilling of stucco is similar to drilling of sheetrock, and inserted fasteners can become loose after a period of time. For devices that are handled repetitively, such as doorbell buttons, this loosening of the fasteners in the; stucco is hastened by the repetitive pushing of the button. Additionally, installers are hesitant to mount doorbell buttons to flexible surfaces such as vinyl siding as it is flexible and does not offer a secure mounting surface. Installers may then mount the doorbell button on the doorjamb, but doorjambs are typically decorative and do not offer the desired flat surface for the installation. Doorjambs are also frequently constructed of wood, which is susceptible to being split when drilled and used for receipt of fasteners.

There is therefore a need for a method and device to provide more secure and permanent installation of doorbell buttons to the exterior of buildings, especially those having flexible or soft exterior sidings such as vinyl siding or stucco. There are many styles of doorbell buttons offered commercially and they typically include two apertures for receipt of fasteners. Unfortunately the spacing between the mounting apertures is not standardized. Therefore, any device provided for enabling more secure installation of doorbell buttons must allow for the variability in mounting geometry. In addition, the doorbell pushbutton itself can be of various shapes and sizes. A device is therefore needed for secure mounting of doorbell buttons that allows for various shapes and sizes of the pushbutton.

U.S. Pat. No. 5,929,378 to Guisti (hereinafter the '378 patent) discloses a doorbell button interface box into which a section of doorbell wire can be folded in a serpentine manner for future use in repairs to the electrical connection of the doorbell button. The interface box includes a plastic neck for receiving the cylindrical body of a doorbell button. The interface box doorbell button is typically mounted within the wall with the plastic neck extending toward a surface of the wall. The '378 patent provides a useful means for storing additional wire for future repairs, however, as the doorbell button fasteners are mounted in the exterior surface of the structure, it does not solve the installation problems encountered with stucco and vinyl siding surfaces. It is also limited to doorbell buttons having cylindrical bodies, which limits its use to a small subset of commercially available doorbell buttons.

U.S. Pat. No. 3,941,915 to Boghosian (hereinafter the '915 patent) discloses a receptacle for wired push-button switches used to actuate appliances adapted for inclusion in walls under construction. The receptacle includes a tubular body with a removable plug that may be secured to a stud with nails. Wires may be pulled through the body and tied off until the wall surface is installed. The plug is typically discarded and a pushbutton installed in its place. Although the '915 patent provides a receptacle for mounting a pushbutton, it does not solve the problem of securely mounting pushbuttons to stucco or vinyl siding. When utilizing the receptacle of the '915 patent, the mounting bracket of the pushbutton is mounted into the existing exterior surface of the structure, and therefore encounters the same problems when used with stucco or vinyl siding. Additionally, the receptacle is limited to pushbuttons of cylindrical shape.

OBJECTS OF THE INVENTION

It is therefore an object of the present invention to provide a method and device to enable secure and permanent installation of doorbell buttons to flexible and soft surfaces, such as vinyl siding, stucco, or similar materials.

It is a further object to provide a method and device for mounting any of the numerous styles and sizes of commercial doorbell buttons, including differently shaped pushbuttons.

It is also an object to provide a method and device that will accommodate any style of mounting; bracket for doorbell buttons, including various fastener spacings.

It is also an object to provide a device that will allow secure mounting of doorbell buttons to the substrate of the exterior of a structure.

Another object is to provide a doorbell mounting device that may be secured to a substrate prior to applying the exterior surface to the substrate.

A further object is to provide a doorbell mounting device that may be adapted for mounting to the substrate of an existing structure by removal of a portion of the surface covering.

It is a further object to provide a doorbell mounting device that is visually appealing and attractive.

It is another object of the present invention to provide a stable, durable system for mounting doorbell buttons on the exteriors of structures.

It is yet a further object of the present invention to provide a mounting system for doorbell buttons that is easily maintained and accessed after installation.

It is a further object of the present invention to provide a mounting system for doorbell buttons that may be inexpensive produced by molding of plastics.

These, and other objects, will become readily apparent to one of skill in the art after reading this disclosure.

BRIEF DESCRIPTION OF THE INVENTION

To provide a secure mounting device doorbell buttons on stucco, vinyl siding, and similar surfaces and accomplish the other aforementioned objects, the applicant has devised a novel two-piece doorbell button mounting device including an enclosure and cover. An aperture is formed in the substrate at a desired location for a doorbell button and appropriate wiring pulled through. The enclosure, including a peripheral wall and a flange around the base of the wall, may be secured around the aperture in the substrate. The wiring is fed through the enclosure and through an opening in a cover member and the cover is secured to the enclosure. A channel is created in the space between the back of the cover and the substrate. Siding or stucco may then be installed around the enclosure and behind the cover thereby filling the channel and obscuring all but the cover from view. The enclosure includes thick wall projections across the face of the enclosure. The attached cover and thick wall projections may be drilled at any appropriate locations to enable attachment of any of a variety of designs and arrangements of commercially available doorbell buttons. Wiring connections are then completed between the doorbell button and the doorbell wires, excess wiring is pushed through the cover into the enclosure, and fasteners are used to secure the doorbell button bracket to the cover and enclosure.

The two-piece doorbell button mounting device may also be used on an existing structure with a stucco or siding exterior. A breakaway feature allows the flange to be broken away from the enclosure. An opening matching the base perimeter of the enclosure may then be cut in the siding or stucco and the enclosure dropped into the resulting opening. Apertures are provided in the enclosure to enable anchoring of the enclosure to the substrate with fasteners. Wiring connections, attachment of the cover, and attachment of the doorbell button are completed in the same manner as for direct attachment to the substrate.

REFERENCE NUMERALS USED IN THE SPECIFICATION AND DRAWINGS

20—two-piece doorbell mounting enclosure and cover
22—enclosure
24—substrate
26—cover member
27—channel
28—peripheral wall
30—integral flange
32—slots
34—top edge of peripheral wall
36—base edge of peripheral wall
38—integral projections
40—thick wall portions
42—apertures in integral projections (for receipt of cover fasteners)
44—alternate enclosure apertures
46—thin wall areas
48—back surface of cover
50—front surface of cover
52—cover apertures (to match apertures 42 in enclosure)
54—cover opening
56—decorative edge of cover
58—pins
60—peripheral edge of back surface of cover
62—pin-receiving area
64—enclosure opening
66—enclosure fasteners
68 wires
70—cover fasteners
72—countersunk entrance
74—exterior wall covering
76—front surface of flange
78—doorbell button
80—bracket
82—bracket apertures
84—pushbutton
86—bracket fasteners
88—pilot holes
89—conductors
90—internal cavity
94—center thick wall portion
96—location for installer drilled apertures

DETAILED DESCRIPTION

As this invention may be more easily explained by reference to the attached drawings, it should be noted that the figures are representative and exemplary of the invention only, and should not be construed as limiting the scope of the invention in any way.

The invention, a two-piece doorbell button mounting device, is suitable for attaching a wide assortment of doorbell buttons to structures having flexible or soft exterior coverings, such as vinyl siding or stucco. Stucco, for example, is a popular and common exterior in many areas of the country. Typically, the screws that fasten a doorbell button to stucco tend to come loose fairly quickly. Vinyl siding is flexible, making installation of surface mounted devices difficult without crushing the vinyl and making an unattractive installation. Mounting the doorbell button to a doorjamb is also not optimal, as wooden doorjambs tend to have curved surfaces and also tend to split with the installation of fasteners. An inexpensive, stable, and easily serviceable mounting platform is critical for attaching devices to surfaces such as vinyl and stucco, and the present invention provides such a platform that is also attractive and easy to install.

Figure 13:
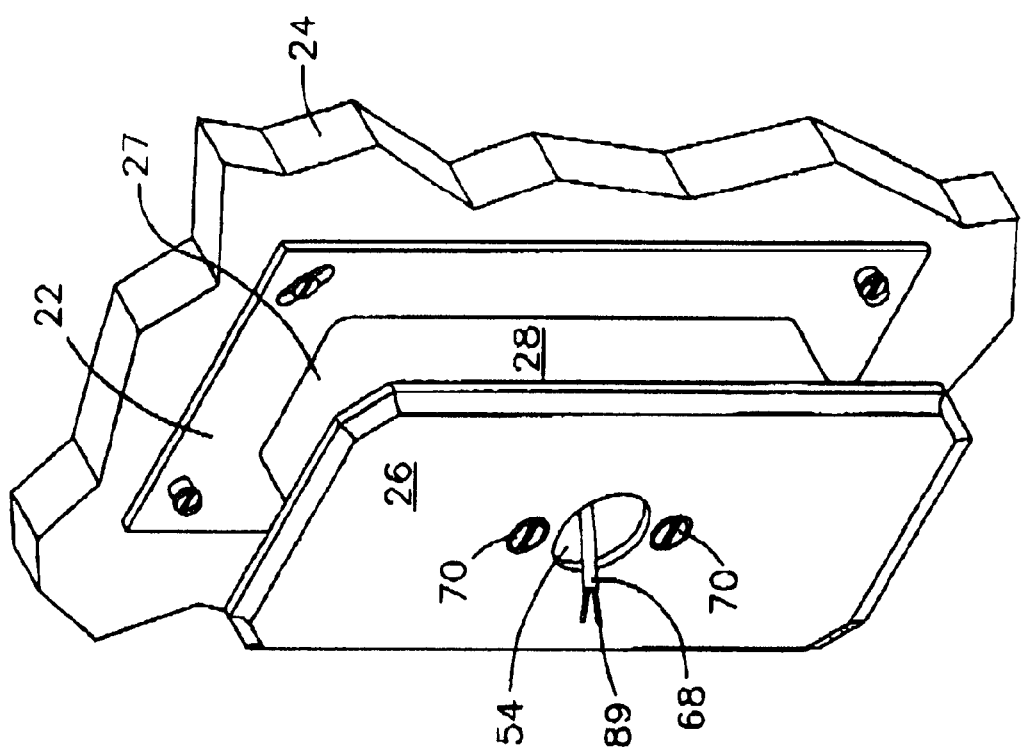
FIG. 13 is a perspective view of an enclosure and cover plate according to the present invention secured to a substrate.

Referring now to FIG. 13, a perspective view is shown of a two-piece doorbell mounting device 20 according to the present invention. The preferred embodiment of the two-piece mounting device 20 includes an enclosure 22 secured to a substrate 24 of a structure and a cover member 26. An integral peripheral wall 28 on the enclosure 22 creates a channel 27 that may be filled with vinyl siding, stucco, or any other appropriate exterior covering typically used to finish a structure.

Figure 7:
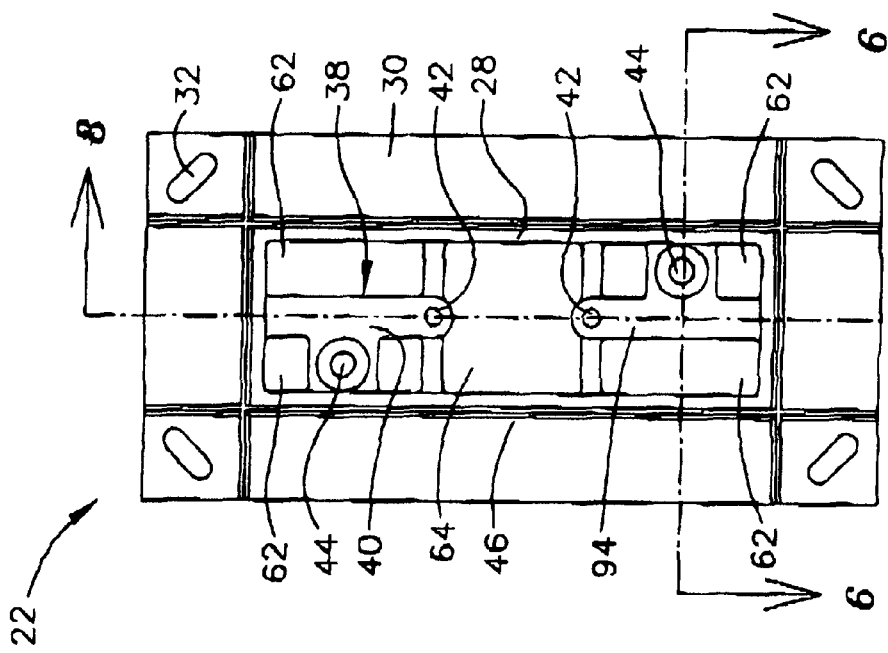
FIG. 7 is a plan view of a preferred embodiment of the enclosure according to the present invention.

Referring now to FIG. 7, a plan view is shown of a preferred embodiment of the enclosure 22. The enclosure is typically molded or formed of one piece and includes the peripheral wall 28. An integral flange 30 extends perpendicular to and outwardly from the peripheral wall 28 and includes slots 32 for receipt of fasteners (not shown).

Figure 8:
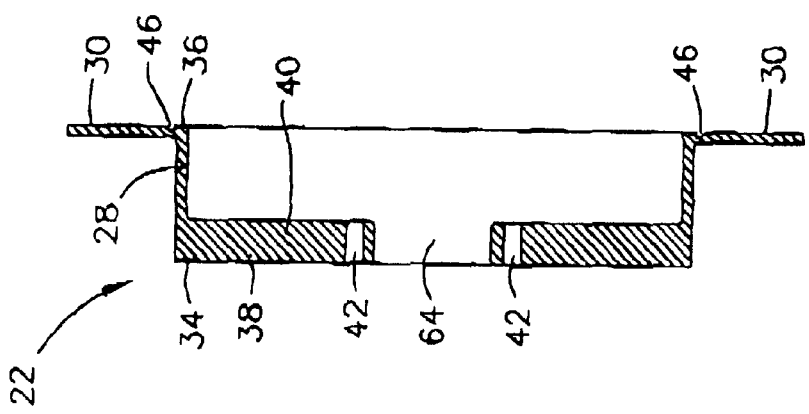
FIG. 8 is a sectional view taken along line 8—8 of FIG. 7.

Referring to FIGS. 7 and 8, the peripheral wall 28 has a top 34 and a base 36 edge. Integral projections 38 are planar with and extend from the top edge 34 of the peripheral wall 28. The peripheral wall 28 includes thick wall portions 40. Apertures 42 are included in the integral projections 38 for receipt of fasteners (not shown) for attaching the cover member (not shown) to the enclosure 22. Alternate enclosure apertures 44 are included in the integral projections 38 for receipt of fasteners (not shown) for securing the enclosure 22 to a substrate (not shown). Thin wall areas 46 are formed in the flange 30 to enable breaking away the flange from the base edge 36 of the peripheral wall 28 if desired. The bottom flange is typically broken away when the enclosure is installed on a structure in which the exterior finish is already applied.

Figure 9:
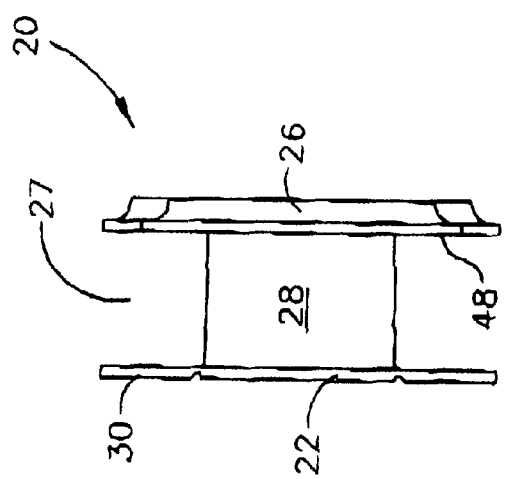
FIG. 9 is a side view of the enclosure of FIG. 7 with the cover plate of FIG. 1 secured thereto.

As shown in the side view of FIG. 9 showing the cover 26 after it is secured to the enclosure 22, a channel 27 is formed between the flange 30 and the back surface 48 of the cover 26 and the channel 27 extends completely around the peripheral wall 28 of the enclosure 22.

Figure 1:
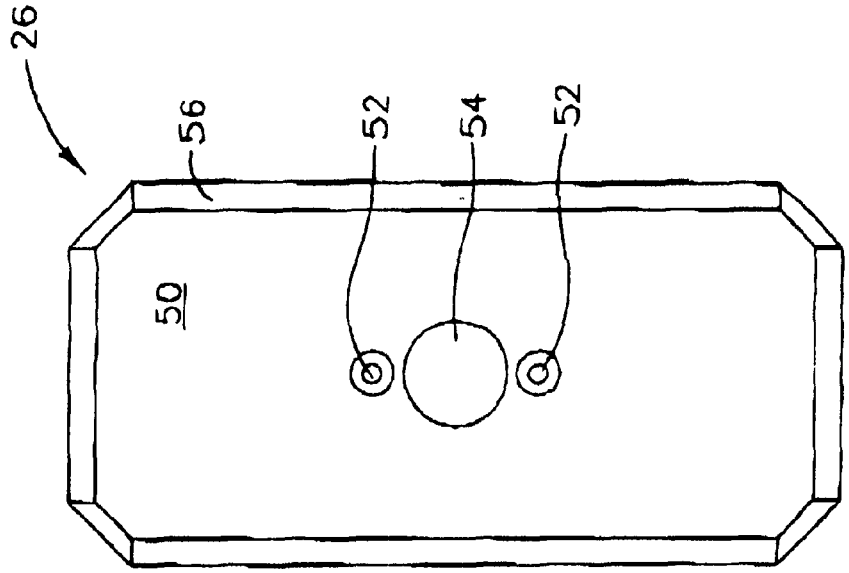
FIG. 1 is a plan view of a preferred embodiment of a cover plate according to the present invention.

Referring now to FIG. 1, the cover 26 includes a front surface 50 and cover apertures 52 to match apertures 42 (not shown) in the enclosure 22. A cover opening 54 is formed in the cover 26 to allow for later passage of wires. The cover 26 may include a decorative edge 56 as shown.

Figure 3:
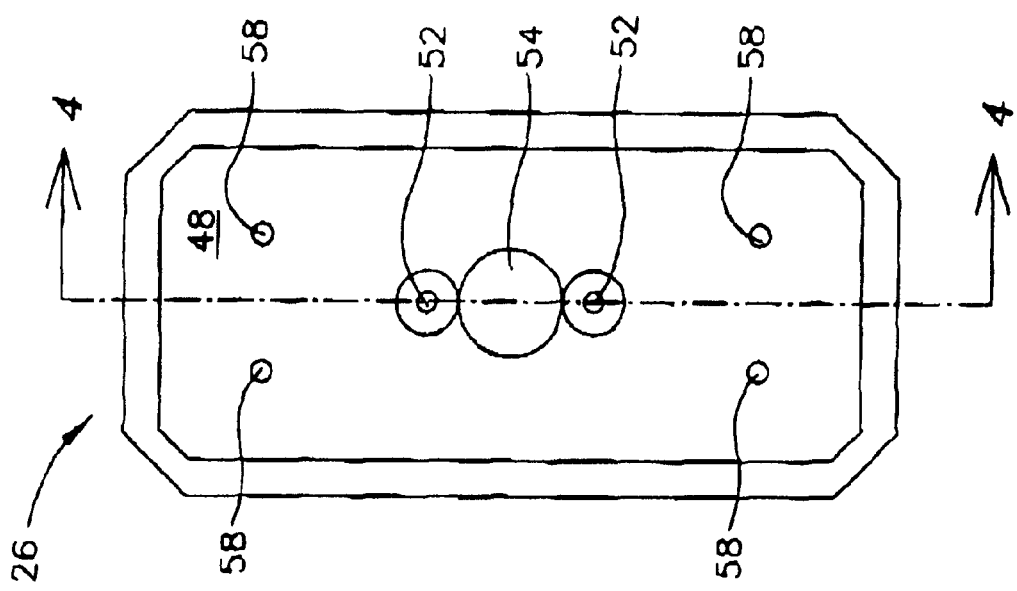
FIG. 3 is a front view of the cover plate of FIG. 1.
Figure 2:
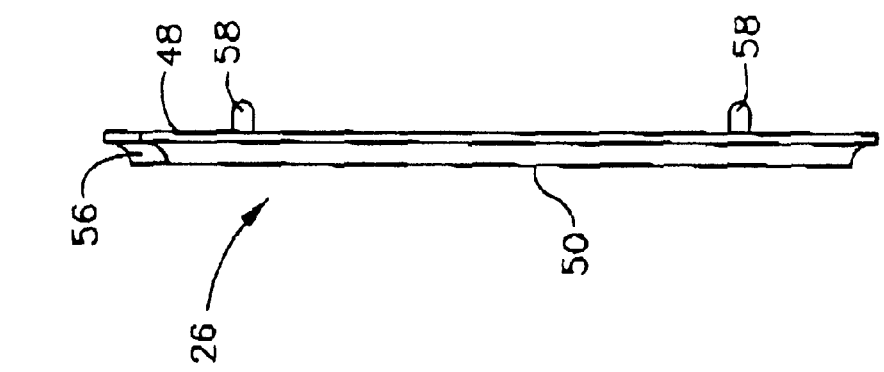
FIG. 2 is a side view of the cover plate as viewed from the right side of FIG. 1.

As shown in FIGS. 2 and 3, the back surface 48 of the cover 26 includes pins 58 which will provide an alignment arrangement for later aligning the cover with the enclosure (not shown).

Figure 5:
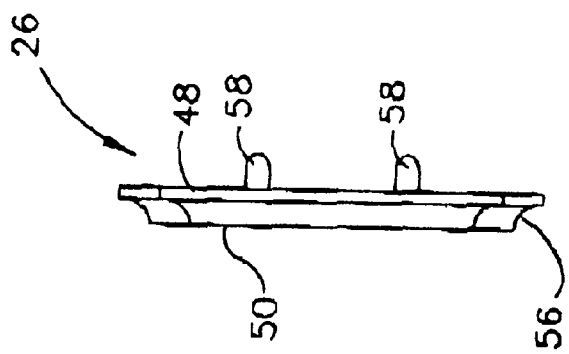
FIG. 5 is a side view of the cover plate as viewed from the bottom side of FIG. 1.
Figure 4:
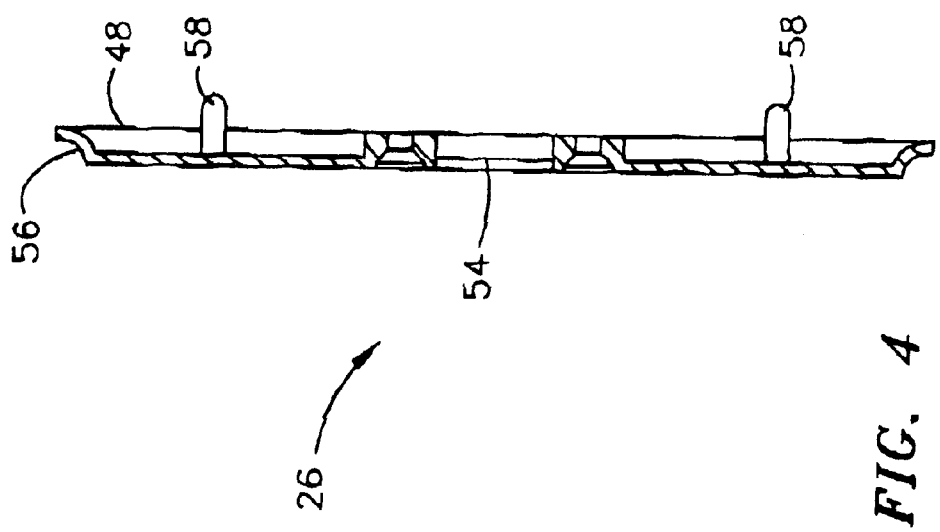
FIG. 4 is a sectional view taken along line 4—4 of FIG. 3.

Referring to FIGS. 4 and 5, the pins 58 are shown extending from the back surface 48 of the cover 26 and extend beyond the peripheral edge 60 of the back surface 48.

Figure 6:
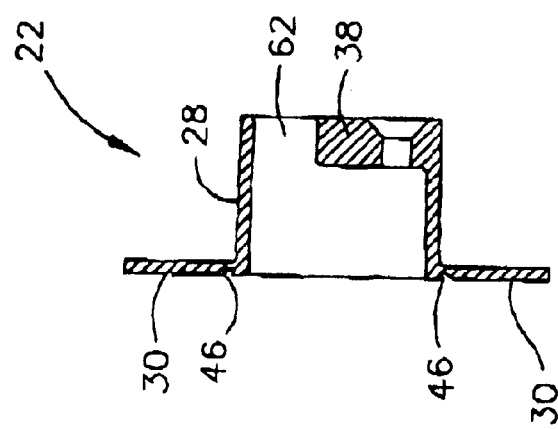
FIG. 6 is a sectional view taken along line 6—6 of FIG. 7.

Now referring to FIG. 6, this cross sectional view of the enclosure 22 taken along line 6—6 of FIG. 7 shows an open area or pin-receiving area 62 between the projections 38 that will work in conjunction with the pins 58 (FIG. 5) to align the cover to the enclosure. As shown in FIG. 7, four pin-receiving areas 62 are included in the enclosure 22. The enclosure 22 also includes an enclosure opening 64 that will cooperate and align with the opening in the cover 26 (FIG. 1) to allow for the later passage of wires between the enclosure and the cover.

The operation of the invention can best be understood by referring to FIGS. 10 through 14 that depict various stages in the operation of the invention when applied to the exterior substrate of a structure.

Figure 10:
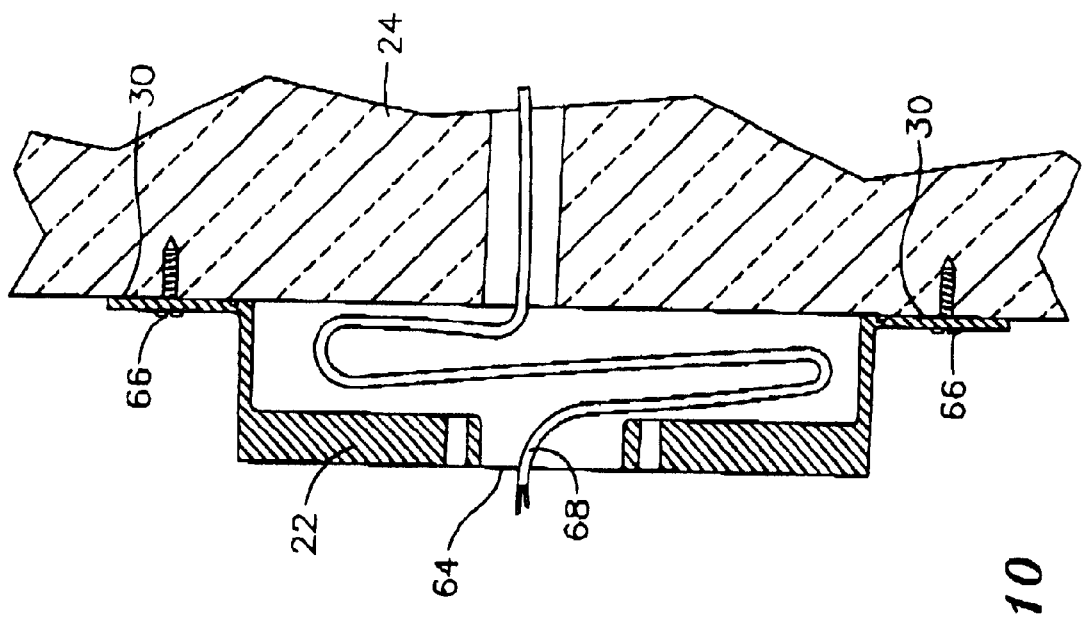
FIG. 10 is a sectional view of an enclosure and cover member according to the present invention shown secured to a substrate.

To place the doorbell mounting enclosure and cover plate in operation the enclosure 22 is first secured to the outer surface of the substrate 24 on a house or other building structure as shown in the sectional view of FIG. 10. A suitable location is first selected near the door and wiring from the doorbell chime mechanism (not shown) is run to that location. Enclosure fasteners 66, typically wood screws, are then fastened through the slots 32 (FIG. 1) of the integral flange 30 to secure the enclosure 22 to the substrate 24. Wires 68 for the doorbell button (not shown) may then be coiled inside the enclosure 22 with the end protruding through the enclosure opening 64.

Figure 11:
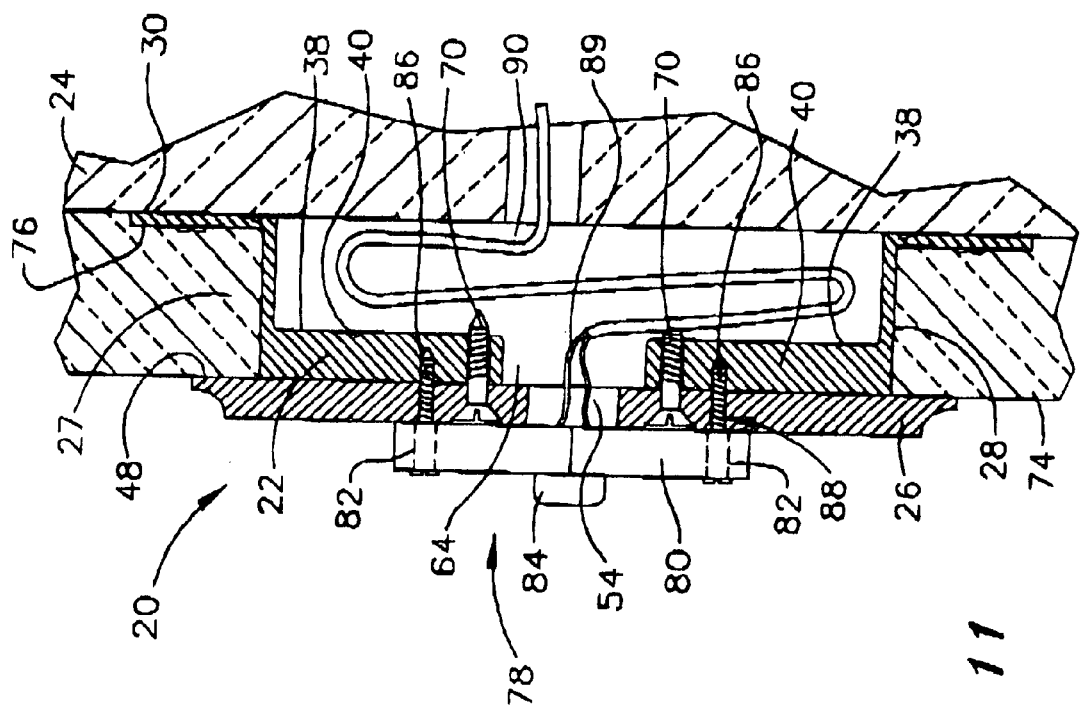
FIG. 11 is a sectional view of an enclosure and cover member according to the present invention shown secured to a substrate and with a doorbell button secured to the cover and enclosure.

Referring now to FIG. 11, after the enclosure 22 is securely mounted to the substrate 24, the cover member 26 is secured to the enclosure 22 with cover fasteners 70 inserted through the cover apertures 52 in the cover 26 into the apertures 42 in the integral projections 38 of the enclosure 22. As shown in FIG. 11, the cover apertures 52 in the cover typically have countersunk entrances 72 to permit the doorbell button to later fit flush over the cover 26.

At this point in the installation, the enclosure 22 is secured to the substrate 24 and the cover 26 is secured to the enclosure 22. A channel 27 is formed between the back surface 48 of the cover 26 and the integral flange 30. The exterior of the structure is then typically finished, with either wood siding, vinyl siding, stucco, or any other typical exterior wall covering 74 fitted into the channel 27 to cover or partially cover the peripheral wall 28 by the thickness of the exterior wall covering 74. The distance between the back surface 48 of the cover 26 and the front surface 76 of the flange 30 is typically 0.75 inch which should accommodate most typical exterior wall coverings. However, should the standard exterior wall thickness increase in the future, the peripheral wall 28 could easily be increased in height to accommodate thicker wall coverings 74.

With the exterior wall covering 74 installed, as shown in FIG. 11, any of a variety of decorative doorbell buttons 78 may be installed. Doorbell buttons 78 typically include a bracket 80 with apertures 82 for receipt of fasteners and a pushbutton 84 to activate the doorbell chimes mechanism (not shown). To secure the doorbell button 78 to the cover 26 and enclosure 22 of the present invention, the thick wall portions 40 of the integral projections 38 are utilized. As doorbell buttons 78 come with their bracket apertures 82 spaced at various distances apart, the present invention provides the compatibility to accommodate any of these variations. The integral projections 38 are provided with thick wall portions 40 from their juncture with the peripheral wall 28 and extend across the enclosure 22 to the enclosure opening 64. The bracket 80 is centered around the cover opening 54 and the locations for the bracket fasteners 86 are marked. Appropriate sized pilot holes 88 are then drilled through the cover 26 and into the thick wall portions 40. The conductors 89 for the doorbell wiring are then connected to the terminals (not shown) on the back of the doorbell button 78. Excess wire length is then pushed into the internal cavity 90 within the enclosure 22 and cover 26. Bracket fasteners 86 are then inserted into the apertures 82 in the bracket 80 and tightened into the cover 26 and thick wall portions 40 of the integral projections 38. Completed in this manner, the mounting enclosure 22 and cover 26 of the present invention provide a sturdy, stable platform for supporting a doorbell button 78. Repeated pushing of the pushbutton 84 will not cause the doorbell button 78 to move around, as it would if mounted on vinyl siding, or work out of the soft exterior surface, as it would if mounted on stucco.

The mounting enclosure 22 and cover 26 of the present invention could also easily be installed on existing structures in which vinyl, stucco, or other exterior coverings are already in place. As previously mentioned, the preferred embodiment of the enclosure 22, as shown in FIG. 7, includes thin wall portions 46 in the integral flange 30 around the outer side of the peripheral wall 28. The flange 30 can therefore be broken away at the edge of the peripheral wall 28 to provide an enclosure 22 without an outward extending flange. The resulting enclosure can then be used to trace an outline at the desired location in the existing siding on a structure. The siding can then be removed down to the substrate within the marked area, and the enclosure 22 placed within the resultant hole in the siding. The alternate enclosure apertures 44 can then be used to secure the enclosure 22 to the substrate (not shown). As shown in FIG. 7, the alternate enclosure apertures 44 are placed in thick wall portions 40 of the integral projections 38 in opposite corners of the enclosure 22 so as to keep the entire length of the center thick wall portion 94 available for later receipt of the bracket fasteners (not shown).

Figure 12:
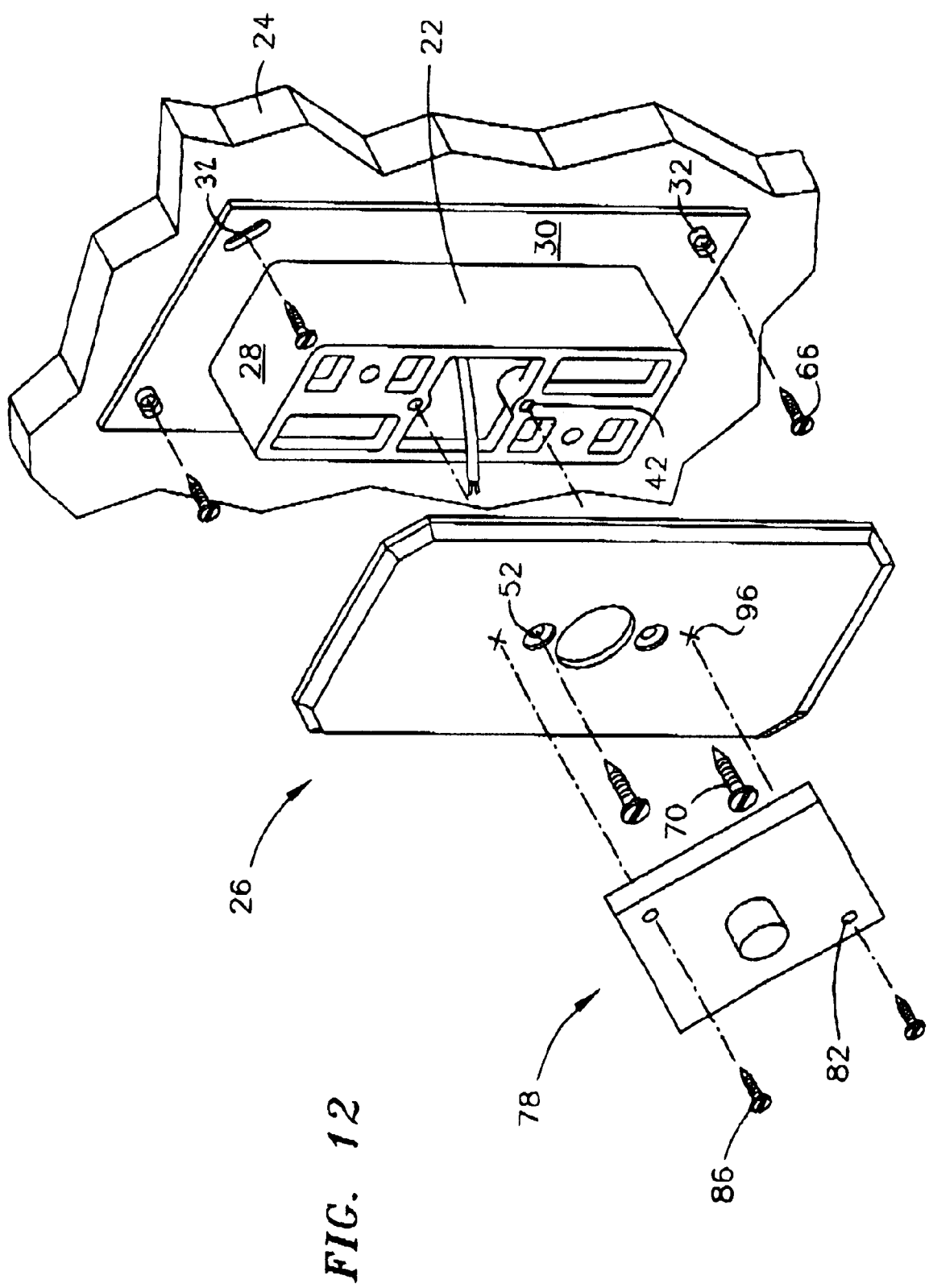
FIG. 12 is a perspective view depicting a preferred enclosure according to the present invention secured to a substrate with a cover plate and a doorbell button exploded away from the box in an alignment to be secured to the enclosure.

Referring to FIG. 12, a perspective view is shown of the preferred enclosure 22 according to the present invention secured to a substrate 24 with a cover plate 26 and a doorbell button 78 exploded away from the enclosure 22 in the proper alignment to be secured to the enclosure 22. Enclosure fasteners 66 fit through the slots 32 in the flange 30 and secure the enclosure 22 to the substrate 24. Cover fasteners 70 fit through the cover apertures 52 and tighten into the apertures 42 in the integral projections 38 to secure the cover 26 to the enclosure 22. Bracket fasteners 86 fit through the bracket apertures 82 of the doorbell button 78 to secure the doorbell button to the cover 26 and enclosure 22. Note that the reference numeral 96 in FIG. 12 refers to the location that an installer will drill apertures for the receipt of the bracket fasteners 86. Since doorbell buttons are of various sizes having various distances between bracket apertures 82, creation of the aperture to accept the bracket fasteners 86 to secure the doorbell button 78 to the cover 26 and enclosure 22 is left to the installer. This makes the cover and enclosure of the present invention very adaptable to being used with virtually any style of doorbell button.

Referring now to FIG. 13, the present invention including the enclosure 22 and the cover plate 26 are shown after being secured to a substrate 24. As shown in the drawing, the enclosure 22 and cover 26 of the present invention provide a very attractive and stable platform for the mounting of doorbell buttons (not shown) and similar devices. The channel 27 easily accepts exterior wall coverings (not shown) up to 0.75 inch thickness.

Figure 14:
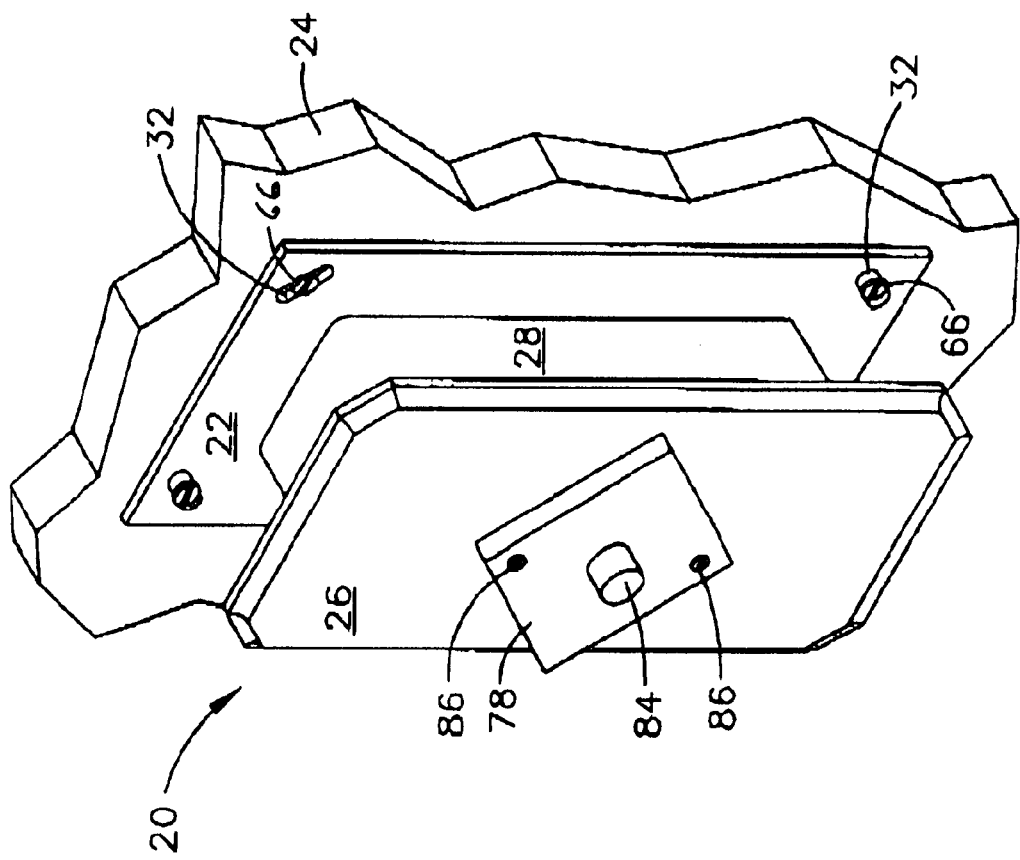
FIG. 14 is a perspective view of an enclosure and cover plate according to the present invention secured to a substrate and with a doorbell button mounted thereon.

FIG. 14 shows the final installation of the enclosure 22 and cover 26 of the present invention with a doorbell button 78 mounted thereon. Attached in this manner, the enclosure 22 and cover 26 of the present invention provide a stable mounting structure for doorbell buttons 78. The enclosure and cover could also be used for other low voltage devices and non-electrical devices in those situations in which a stable mounting platform is required on soft or flexible surfaces. Other devices may include timers for irrigation devices or lights, control boxes for low voltage lighting systems, phone jacks, and similar such items.

Referring to FIG. 7, typical dimensions for a preferred embodiment of the enclosure 22 including the flange 30 would be 2.25 inches width by 4.625 inches length. The dimensions of the internal cavity 90 as measured within the peripheral wall is typically 0.938 inch by 3.126 inches. The height of the peripheral wall 28 extending out from the flange 30 is 0.75 inch. The preferred thickness of the thick wall portions 40 of the integral projections 38 is 0.25 inch.

Referring to FIG. 1, the typical dimensions for the cover are an overall width of 2.25 inches and an overall length of 4.625 inches. Therefore, in the preferred embodiment, the outer periphery of the cover extends far enough to cover the outer periphery of the flange when it is secured thereto. The cover opening 54 is typically 0.625 inch in diameter.

Although the drawings show a rectangular-shaped enclosure, cover, and peripheral wall, these members could also be designed in other shapes, such as circular, oblong, or any of a myriad of polygonal or decorative shapes and still be designed as moldable objects with integral projections and all of the other features of the preferred embodiment.

So therefore, while the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. A two-piece doorbell button mounting device comprising:
   an enclosure including a peripheral wall having planar base and top edges;
   an integral peripheral flange perpendicular to and extending outwardly from said wall at said base edge;
   apertures in said flange for securing said enclosure to the exterior substrate on a building;
   integral projections planar with and extending between two of said top edges, said integral projections including a front surface;
   a cover for said enclosure, said cover including a back surface;
   an alignment arrangement for aligning said cover with said enclosure;
   a fastening arrangement for securing said cover to said enclosure;
   thick wall portions on said projections; and
   an opening in said cover in alignment with an opening in said enclosure for passage of wires therethrough,
   wherein securement of said cover to said enclosure by said fastening arrangement aligns said back surface of said cover with said front surface of said thick wall portions thereby providing an area on said mounting device capable of accepting pilot holes for receipt of fasteners for attaching the mounting plate of a doorbell button thereto.

2. The two-piece doorbell button mounting device of claim 1 wherein said cover and said enclosure are molded of a plastic material.

3. The two-piece doorbell button mounting device of claim 1 wherein said flange includes thin wall areas bordering said base edge to enable breaking off said flange at said base edge.

4. The two-piece doorbell button mounting device of claim 1 wherein said thick wall portions include apertures for mounting of said enclosure to a substrate when said flange is broken off at said base edge.

5. The two-piece doorbell button mounting device of claim 1 wherein said cover and said enclosure are constructed of polyvinyl chloride, polycarbonate, or polyethylene.

6. The two-piece doorbell button mounting device of claim 1 wherein said alignment arrangement includes:
   pins extending from the back of said cover; and
   open areas between said projections on said enclosure wherein said pins slide into said open areas when aligned thereto.

7. The two-piece doorbell button mounting device of claim 1 wherein said fastening arrangement includes:

apertures in said cover;

apertures in said projections that align with said apertures in said cover when said cover is aligned thereon; and fasteners for securing said cover to said enclosure.

8. A two-piece doorbell button mounting device comprising:

an enclosure including a peripheral wall having planar base and top edges;

an integral peripheral flange perpendicular to and extending outwardly from said wall at said base edge;

apertures in said flange for securing said enclosure to the exterior substrate on a building;

a cover for said enclosure, said cover including a back surface;

an alignment arrangement for aligning said cover with said enclosure;

a fastening arrangement for securing said cover to said enclosure;

thick wall portions integral with and projecting from said back surface of said cover; and an opening in said cover in alignment with an opening in said enclosure for passage of wires therethrough, wherein securement of said cover to said enclosure by said fastening arrangement aligns said thick wall portions of said cover with apertures on the mounting plate of a doorbell button, thereby providing an area on said mounting device capable of accepting pilot holes for receipt of fasteners for attaching said mounting plate of said doorbell button thereto.

\* \* \* \* \*